UNITED STATES PATENT OFFICE.

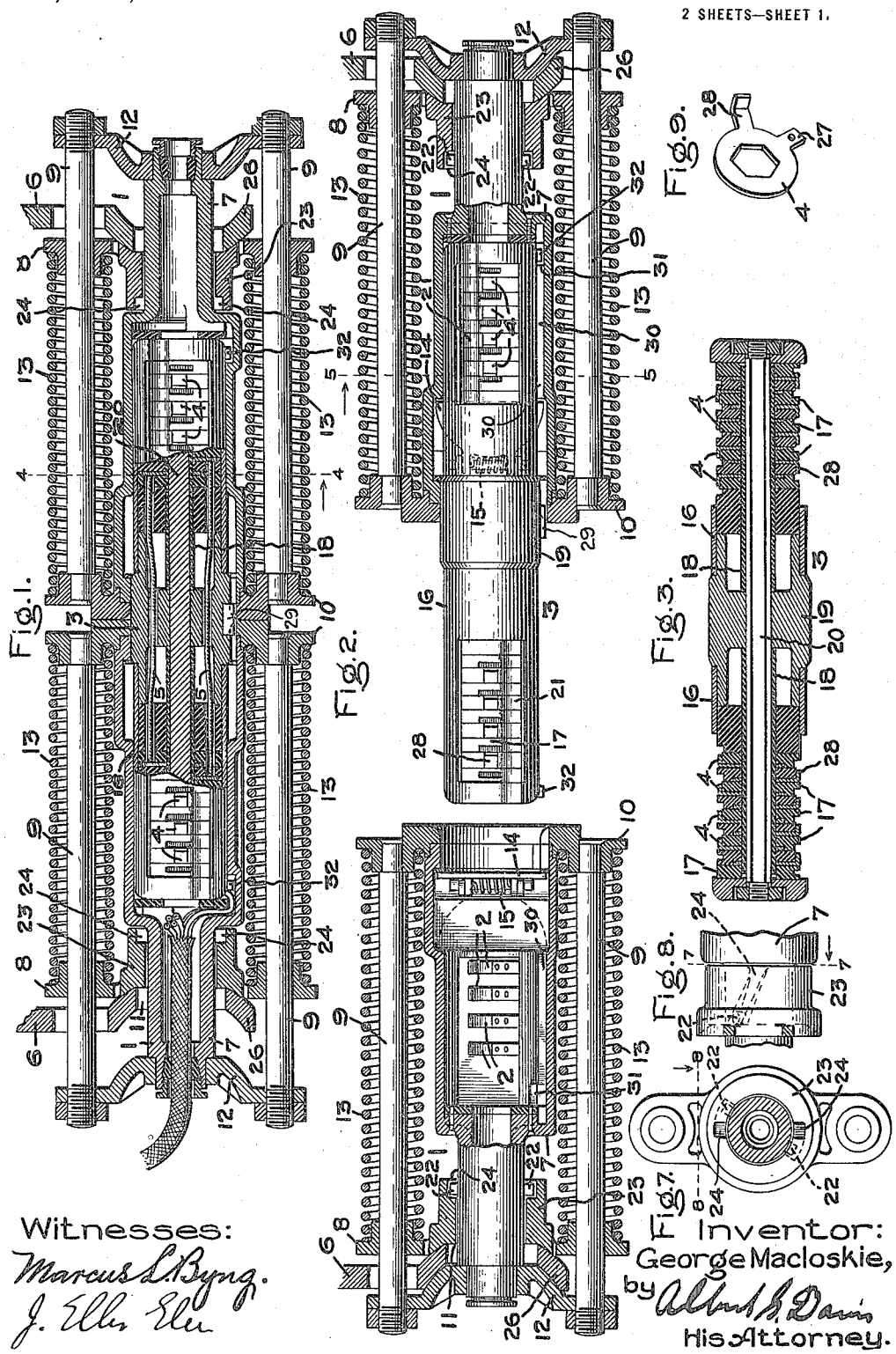

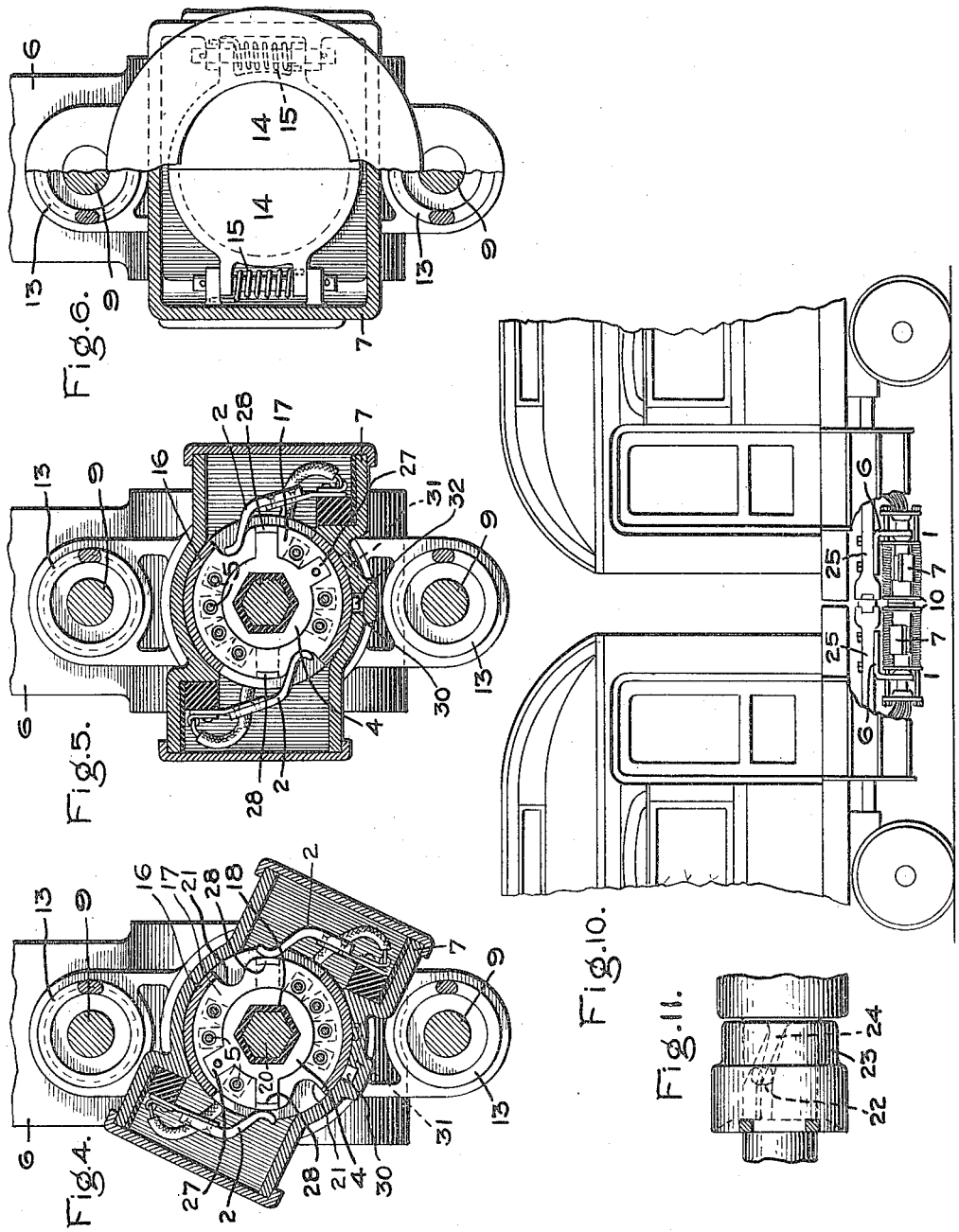

GEORGE MACLOSKIE, OF SCHENECTADY, NEW YORK, ASSIGNOR TO GENERAL ELECTRIC COMPANY, A CORPORATION OF NEW YORK.

AUTOMATIC TRAIN-LINE COUPLING.

1,164,298.  Specification of Letters Patent.  Patented Dec. 14, 1915.

Application filed July 22, 1911. Serial No. 639,909.

*To all whom it may concern:*

Be it known that I, GEORGE MACLOSKIE, a citizen of the United States, residing at Schenectady, county of Schenectady, State of New York, have invented certain new and useful Improvements in Automatic Train-Line Couplings, of which the following is a specification.

The object of my invention is the construction of an improved cable coupler especially adapted for use with electric cars where it is necessary to connect together between each two cars a number of cables.

The construction involving my invention is adapted to automatically couple the cables on the cars with the automatic coupling of the draw bars. The coupling though positively and automatically connecting the cables together allows all the relative movements to which cars in normal operation are subjected.

My invention involves the use of socket members, one attached to each cable, and a connecting link. The link has near each end a contact for each conductor, these contacts being jointed together in sets through the link. To couple the conductors together the link is inserted in one of the socket members, then another socket member is brought toward the first, the link entering the other socket member and making the necessary contacts.

While I have shown means for coupling but two cables together, it will be obvious that my invention is not limited, in its broadest aspect, to coupling this number of cables only.

Figure 1 is a sectional view of two socket members and a link in coupled position. Fig. 2 is a sectional view of two socket members with a link in elevation, the socket members separated in the relative positions they normally occupy prior to connection. Fig. 3 is a sectional view through the center of the connecting link. Fig. 4 is a sectional view through a socket member and the link taken on the line 4—4 of Fig. 1. Fig. 5 is a similar view taken on the line 5—5 of Fig. 2. Fig. 6 is an end view partly in section and partly in elevation of one of the socket members showing the hinged covers closing the socket member when the member is not in use. Figs. 7 and 8 partly in section and partly in elevation, taken on the lines 7—7 and 8—8 of Figs. 8 and 7 respectively, show the relative positions of the pin and cam which cause the rotation of the socket member. Fig. 9 is a perspective view of one of the contact pieces of the link. Fig. 10 shows a preferred location of the couplers, on two cars. Fig. 11 shows a modification of the parts shown in Figs. 7 and 8.

My invention allows the simultaneous coupling of a large number of conductors. The construction shown is adapted to connect eight conductors, though it will be obvious that this number may be increased or decreased as desired without departing from my invention. To efficiently couple together the conductors, I propose to attach to each cable a socket 1 and in this socket expose the end of the conductor or conductors. Preferably the ends of the conductors will be attached to the contact fingers 2 which form a part of the socket members. With these socket members I employ a link 3, which link carries contact pieces 4, one for each conductor. Sets of these contact pieces are connected together by insulated wires 5 within the link. Thus conductors which contact with those contact pieces which are connected together, are thereby themselves conductively connected together. The link may be inserted into one socket member and the remaining socket member or members then brought over the projecting end or ends of the link. It will of course, be obvious that although I have shown the link as having but two ends and being adapted to connect the ends of but two cables, that should it be desired to connect together the conductors of more than two cables, that this can be done by the use of a link having the proper number of branches, each branch carrying contact pieces. Such couplings are at times subject to certain longitudinal strains. This is especially true with couplings used on cars, since the cars are subject to considerable longitudinal movement relatively to each other. I have provided for this movement with each socket member.

A supporting member 6 carries the socket member 7 slidable relatively thereto, the socket member 7 directly carrying the contact fingers 2. One or more cables carrying conductors may be brought through the rear of each socket member to an insulating piece therein, and the conductors separated and carried therethrough to the contact fingers. Between the supporting member and the socket member, springs are placed, which maintain the socket member in a certain definite position when uninfluenced by outside forces. I prefer to do this by placing on the supporting member an abutment member 8. Slidable through this abutment member I extend rods 9, which at one end carry the socket abutment 10, which in its turn supports one end of the socket member 7, the other end of the socket member 7 sliding through the abutment member 8 at 11. The ends of the rods 9 adjacent the opening 11 carry the member 12 which has attached the free end of the socket member 7. Around the rods 9 and between the abutment members 8 and 10, I place springs 13.

The link 3 may be inserted into one socket member 7, and when the other socket member has been brought toward and over the link, considerable change relatively may take place between the supporting members 6 without deranging the sockets and link relatively, since the springs 13 at all times tend to maintain the entrance ends of the socket members as far away from the supporting members 6 as the rods 9 will allow. The devices should be so designed and located that when the supporting members 6 are in their normal positions the springs 13 are somewhat compressed as shown in Fig. 1.

Snow, sleet or dirt might accumulate in the socket members to such an extent as to short circuit the contacts located therein, or prevent successful operation when the link is afterward inserted, were not some means provided for closing the socket members when not in use. To close the ends of the socket members I provide the hinge covers 14. Preferably I cover the entire opening in each socket by two covers 14, each covering half of the opening, and each being pivoted to one side of the socket member 7 and being normally held in closed position by the spring 15.

The engagement of the contact pieces on the link and the contact fingers in the socket members by a straight insertion of the link, as I have heretofore presumed, has certain disadvantages. I prefer therefore, to so construct the socket members and the link that they may have relative rotation, and to so locate the contact fingers and contact pieces that no contacts are made until after complete insertion and then make all contacts simultaneously by the relative rotation. In the preferred construction, the contact fingers 2 have curved contact faces as shown, and have considerable resiliency; when the socket member is not occupied by the link, these contact fingers extend a short distance into the path of the link. The link I prefer to construct from a plurality of tubes 16, each tube having an opening exposing the contact pieces 4. If necessary more than one opening may be provided due to the number of contact pieces. I have in the construction shown provided two such openings in each tube and arranged in each opening four contact pieces, thus allowing the use of eight sets of contact pieces and the connection of eight conductors. Each tube is closed at one end and has inserted into it alternately, pieces of insulating material 17 and the contact pieces 4, these being all placed about an insulating tube 18. The contact pieces 4 I preferably construct with a polygonal opening and construct the insulating tube 18 of a similar shape and size. This prevents the relative rotation of the contact pieces. Each contact piece has a connecting projection 27 and a contact projection 28. The different sets of contact pieces have their connecting projections 27 differently located with respect to the contact projections 28, each set of contact pieces having their connecting projections and contact projections similarly located. This allows the parallel positioning of the connecting conductors 5 within the link 3, no cross overs of any kind being necessary. The insulating pieces entirely surround and inclose the contact pieces except the contact projections. When the required number of insulating pieces and contact pieces have been placed in position, I place the open ends of the tubes 16 over a body portion 19 and firmly attach the tubes thereto. Where a link having but two ends is used, this may be done quite efficiently by inserting a rod 20 through the insulating tube 18 and threading a nut on each end of the rod. The end of each branch of the link has one or more depressions 21. The insulating pieces in the link have similar depressions, the insulating pieces being so arranged that the depressions are in alinement as shown in Figs. 2, 4 and 5. The contact projections are located in alinement at the sides of these depressions. The contact fingers 2 located in the socket member 7, are also in alinement, their curved contact faces more or less conforming to the depression 21. Hence when the link is inserted into a socket member, the contact fingers 2 ride more or less loosely in the depressions 21 out of the contact with the contact pieces 4 until the link is completely inserted and the fingers are opposite their respective pieces.

Contact with all the contact fingers may be made simultaneously by a slight rotation of the link and the socket member 7 relatively. On such a relative rotation the contact fingers 2 rise up out of the depression 21 into contact with the respective contact pieces as shown in Figs. 5 and 4.

The relative rotation of the socket member 7 and the link 3 may be obtained in any desired way. I prefer, however, to cause the rotation of the socket member relatively to the supporting member 6, holding the link 3 stationary, and to rotate the socket member 7 I have provided a slot and pin connection between it and the supporting member. I prefer to apply the pin 22 to the socket member and provide a projection 23 from the abutment member 8 with a cam slot 24. When the springs 13 are fully extended, the pin 22 is in the outer end of the slot 24. As the sockets are brought together, the link 3 is forced straight into one socket member, it previously having been inserted into the other. When thus simply inserted, however, the contact fingers 2 ride in the depressions 21 as previously pointed out and the springs 13 are still fully expanded. The contact pieces 4 are opposite the respective contact fingers 2, but out of engagement therewith. As the supporting members 6 of the sockets are now brought still closer together, the springs 13 are compressed, the socket members ride backward through the supporting members 6 and are caused to rotate in their seats in the members 10 and 12 by reason of the pins 22 in the cam slots 24. The pitch of these cam slots is such that when the supporting members 6 have reached their normal positions, the socket members 7 have rotated sufficiently to draw the contact fingers 2 from the depressions to contact with the contact pieces 4. If these supporting members are so located that there will be little or no longitudinal play between them during the normal connection of the cables, the cam slots 24 may be as shown in Fig. 8. However, it may be that the supporting members 6 will have considerable longitudinal play during the period when the cables are coupled. Such play, were a slot such as is shown at 24 in Fig. 8 used might cause the separation of the contact fingers 2 and the contact pieces 4. To prevent this the modification shown in Fig. 11 may be used. This modification consists in lengthening the projection 23, if necessary, and providing an extension to the slot 24 longitudinal to the socket member 7. With such a slot the socket member 7 should be completely rotated to bring the contact fingers on the contact pieces prior to the normal location of the supporting members 6 relatively. The supporting members 6 may then move relatively a distance equal to the length of the longitudinal extensions of the slot 24 without rotating the socket member 7.

The link 3 should preferably be provided with a key 29 on the circumference near its center and a pin 32 at each end. This key when the link is inserted into one socket member should extend into a slot in the socket abutment 10, thus preventing the rotation of the link and the misplacement of the contact pieces thereby. Each socket member is provided with a longitudinal groove 30 intersecting an inner peripheral groove 31. (See Figs. 2, 4 and 5). The pins, during the insertion of the link into the socket members, ride in the longitudinal grooves 30, reaching the ends of these grooves at the complete seating of the link. As the socket member rotates, the pin 32 enters the peripheral groove 31. The link is thus positively located in the sockets until the socket members are rotated in a reverse direction and the contacts broken.

The supporting members 6 may be attached to any desired structures. When the socket members are used with railway cars, however, I prefer to attach the supporting members 6 to the draw bars 25 as shown in Fig. 10. There is, however, between such draw bars some angular movement, as when going around curves. To allow for this angular movement, I construct the lower ends 26 of the supporting members 6 with a surface curved at least in the direction at right angles to the section of Fig. 1. The abutment member 8 and projection 23 I then prefer to make integral and with a seat adapted to fit over this curved surface of the supporting member 6. I prefer to make this curved surface a part of a sphere, spherical both in the plane of the section in Fig. 1 and in the plane at right angles thereto, for such a construction allows for all angular movement whatsoever between the draw bars 25 and for some lateral displacement. It will be apparent that angular movement between the supporting members 6 or lateral displacement will cause the abutments 8 and projections 23 to slide over the curved seats on the members 6, this movement being accompanied by a small longitudinal movement taken up by the springs 13.

It will be apparent from the construction before described that in order to couple two cables together, it is merely necessary to insert the link into one socket and bring the remaining socket or sockets over the projecting end or ends of the link. When such sockets are used with railway cars, they will of course, be located at a uniform distance below the cars. In order therefore, to couple such cables together it will be merely necessary to insert the pin into one of the sockets; the bringing of the cars together to couple the drawheads will at the same time cause the coupling of the cables, since the second socket member will be forced over the projecting end of the link and the supporting members 6 moved sufficiently close together to cause the rotation of the socket members.

What I claim as new and desire to secure by Letters Patent of the United States, is,—

1. The combination with a plurality of cables, of a socket for each cable having a contact finger attached to a conductor, a connecting link, and contact pieces carried thereby, connected together and adapted to contact with the contact fingers after the insertion of the link into the sockets and their relative rotation, and means for rotating the link and sockets relatively.

2. An attaching socket including a supporting member, a socket member slidable and rotatable relatively thereto carried thereby, a contact finger carried by and within said socket member between the axis of the socket member and its wall for attachment to a conductor, and a pin and inclined slot connection between the two members.

3. An attaching socket including a supporting member, a movable socket member slidable and rotatable relatively thereto and supported thereby, a contact finger carried by and within said socket member between the axis of the socket member and its wall for attachment to a conductor, and cam means between the two members for rotating the movable member as it slides.

4. An attaching socket including a supporting member, a movable socket member slidable and rotatable relatively thereto and supported thereby, springs between the members tending to hold the members in a certain relative position, a contact finger carried by and within said socket member between the axis of the socket member and its wall for attachment to a conductor and pin and inclined slot connection between the two members.

5. An attaching socket including a supporting member, a movable socket member slidable and rotatable relatively thereto and supported thereby, springs between the members tending to hold the members in a certain relative position, a contact finger carried by and within said socket member between the axis of the socket member and its wall for attachment to a conductor and cam means between the two members for rotating the movable member as it slides.

6. An attaching socket including a supporting member, a socket member revoluble thereabout and slidable and rotatable relatively thereto supported thereby, a contact finger carried by and within said socket member between the axis of the socket member and its wall for attachment to a conductor and cam means between the two members for rotating the rotatable member as it slides.

7. A connecting link for connecting cables including a straight rigid member, an insulated contact piece carried on the surface near each end thereof, the contact pieces being connected together, and a key projecting from the surface, and lying longitudinally, of the rigid member.

8. A connecting link for connecting cables including a straight rigid member, an insulated contact piece carried thereby near each end, the contact pieces being connected together, a key projecting from the surface of, and lying longitudinally of the rigid member and an attaching pin on the rigid member.

9. The combination with an attaching socket including a supporting member, a socket member, an exposed conductor therein and means for rotating the socket member and supporting member relatively, of a link adapted for insertion into the socket member, a contact piece carried thereby, and means to prevent the relative rotation of the supporting member and the link until after the insertion of the link into the socket member a given distance.

10. The combination with an attaching socket including a supporting member, a socket member carried thereby, and an exposed conductor carried within the socket member, of a link provided with a longitudinal groove adapted on the insertion of the link into the socket member to receive the exposed conductor, a contact piece carried by the link at one side of the groove, and means to cause the engagement of the exposed conductor and the contact piece after the complete insertion of the link.

In witness whereof, I have hereunto set my hand this 21st day of July, 1909.

GEORGE MACLOSKIE.

Witnesses:
BENJAMIN B. HULL,
HELEN ORFORD.

Copies of this patent may be obtained for five cents each, by addressing the "Commissioner of Patents, Washington, D. C."